(12) United States Patent
Olson

(10) Patent No.: US 10,421,387 B2
(45) Date of Patent: Sep. 24, 2019

(54) SWIVEL MOUNT CARGO WINCH

(71) Applicant: POWER PIN INC., Fort Qu'Appelle, Saskatchewan (CA)

(72) Inventor: Brian R. Olson, Fort Qu'Appelle (CA)

(73) Assignee: POWER PIN INC., Fort Qu'Appelle (CA)

( * ) Notice: Subject to any disclaimer, the term of this patent is extended or adjusted under 35 U.S.C. 154(b) by 86 days.

(21) Appl. No.: 15/678,307

(22) Filed: Aug. 16, 2017

(65) Prior Publication Data

US 2018/0304797 A1    Oct. 25, 2018

(30) Foreign Application Priority Data

Apr. 24, 2017    (CA) .................................... 2965036

(51) Int. Cl.
*B60P 7/08*    (2006.01)

(52) U.S. Cl.
CPC ............... *B60P 7/083* (2013.01); *B60P 7/08* (2013.01); *B60P 7/0807* (2013.01); *B60P 7/0846* (2013.01)

(58) Field of Classification Search
CPC ....... B60P 7/083; B60P 7/0853; B60P 7/0846; B60P 3/075; B60P 7/0823; B60P 7/0861; B60P 3/064; B60P 7/08
USPC ....... 410/103, 100, 12, 23, 104, 116, 19, 20, 410/81, 96, 98, 3, 26; 254/223, 218, 220, 254/106, 108, 109, 323, 360, 369, 380
See application file for complete search history.

(56) References Cited

U.S. PATENT DOCUMENTS

| | | | | |
|---|---|---|---|---|
| 2,946,563 | A * | 7/1960 | Eaton | B60P 7/083 254/217 |
| 2,991,975 | A * | 7/1961 | Alexander | B60P 7/083 254/219 |
| 4,382,736 | A * | 5/1983 | Thomas | B60P 7/083 410/100 |
| 5,490,749 | A * | 2/1996 | Arbues | B60P 7/083 24/68 CD |
| 5,664,918 | A | 9/1997 | Heider et al. | |
| 6,626,621 | B1 | 9/2003 | Hugg | |
| 6,742,972 | B2 * | 6/2004 | Brunet | B60P 7/083 410/100 |
| 7,311,483 | B1 * | 12/2007 | Nudo | B60P 7/0869 410/41 |
| 8,096,740 | B1 | 1/2012 | Parker et al. | |
| 9,469,239 | B2 * | 10/2016 | Armour | B60P 7/083 |

* cited by examiner

*Primary Examiner* — D Glenn Dayoan
*Assistant Examiner* — Sunsurraye Westbrook
(74) *Attorney, Agent, or Firm* — King & Schickli, PLLC

(57) ABSTRACT

A winch apparatus for mounting to a load bed comprises a mounting bracket adapted to be mounted to a side edge of the load bed, and a pivot bracket pivotally mounted to the mounting bracket about a substantially vertical winch swivel axis. A winch is attached to the pivot bracket and configured such that, when the mounting bracket is mounted to the side edge of the load bed, a winch shaft of the winch is oriented substantially horizontally and a bottom of the winch is at a vertical location that is above a top surface of the load bed such that the winch can pivot over the top surface of the load bed. The winch can be configured to be conveniently driven by a conventional and commonly available ratchet wrench of a size appropriate to the particular winch.

6 Claims, 2 Drawing Sheets

SWIVEL MOUNT CARGO WINCH

This disclosure relates to the field of transportation equipment and in particular a swivel mount for a cargo winch such as is used with cargo straps to secure loads on trailer beds.

BACKGROUND

Cargo is commonly secured to load beds on trucks and trailers by cargo straps. Typically stake pockets and rails are attached along each side edge of the load bed and winches are attached along one side of the load bed and the straps are thrown over the load and hooks on the outer ends of the straps are secured to the stake pockets or rails.

As a typical example U.S. Pat. No. 8,096,740 to Parker et al. discloses winches mounted under the rails along one side of a trailer load bed with cargo straps extending upward over the rails on the winch side of the load bed and across to the opposite side of the load bed perpendicular to the longitudinal axis and the edges of the load bed.

U.S. Pat. No. 6,626,621 to Hugg discloses winches removably attachable to the rails or pockets along one side of the load bed such that the winches are somewhat above the rails and the load bed. Again the cargo straps extend across to the opposite side of the load bed perpendicular to the edges of the load bed.

U.S. Pat. No. 5,664,918 to Heider et al. discusses the problems of securing odd shaped loads since the straps cannot be turned to any significant angle with respect to the surface of the load bed, but must extend across the load bed generally perpendicular to the side edges thereof. It is typical therefore to use chains and load binders to secure odd shaped loads such as vehicles, which have their own problems. Heider then goes on to provide a winch mounted to the sides of the load bed about a horizontal pivot axis extending perpendicular from the side of the load bed. The cargo strap can then extend upward from the winch roller and be attached at an elevated location on a vehicle or like piece of equipment that is forward or rearward of the winch.

SUMMARY OF THE INVENTION

The present disclosure provides a winch apparatus that overcomes problems in the prior art.

In a first embodiment the present disclosure provides a winch apparatus for mounting to a load bed. The apparatus comprises a mounting bracket adapted to be mounted to a side edge of the load bed, and a pivot bracket pivotally mounted to the mounting bracket about a substantially vertical winch swivel axis. A winch is attached to the pivot bracket and configured such that, when the mounting bracket is mounted to the side edge of the load bed, a winch shaft of the winch is oriented substantially horizontally and a bottom of the winch is at a vertical location that is above a top surface of the load bed such that the winch can pivot over the top surface of the load bed.

In a second embodiment the present disclosure provides a load bed and winch apparatus. The apparatus comprises a load bed with a plurality of stake pockets spaced along side edges thereof. A mounting bracket extends downward into one of the stake pockets and is attached to the stake pocket, and a pivot bracket is pivotally mounted to a top end of the mounting bracket about a substantially vertical winch swivel axis. A winch is attached to the pivot bracket and configured such that a winch shaft of the winch is oriented substantially horizontally and a bottom of the winch is at a vertical location that is above a top surface of the load bed such that the winch can pivot over the top surface of the load bed.

In a third embodiment the present disclosure provides a method of driving a winch to tighten a cargo strap on a load bed. The method comprises mounting the winch to a first side edge of the load bed; winding a cargo strap onto a winch shaft of the winch, the cargo strap comprising an engagement member on an outer end thereof; attaching the engagement member to a desired location; forming a substantially square drive recess in a drive end of the winch shaft, the drive recess configured to receive a drive head of a ratchet wrench; and inserting the drive head of the ratchet wrench into the drive recess and operating the ratchet wrench to tighten the cargo strap.

The present disclosure thus provides a winch apparatus and method that allows cargo straps to extend at various angles with respect to a winch attached to a side edge of the load bed to secure loaded objects of various sizes and dimensions. The winch can be configured to be conveniently driven by a conventional and commonly available ratchet wrench of a size appropriate to the particular winch.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
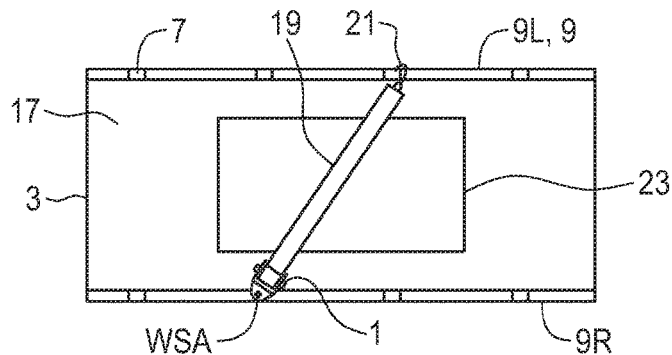
FIG. 1 is a schematic top view of an embodiment of the winch apparatus of the present disclosure securing a load on a load bed.

FIGS. 1-4 schematically illustrate an embodiment of a winch apparatus 1 of the present disclosure for mounting to a load bed 3 of a vehicle such as a truck or trailer. The apparatus 1 comprises a mounting bracket 5 adapted to be mounted to a side edge of the load bed 3. The illustrated load bed 3 includes, as is common in the industry, a plurality of stake pockets 7 spaced along right and left side edges 9R, 9L thereof. The mounting bracket 5 is conveniently configured to extend downward into one of the stake pockets 7 and be attached thereto by a pin or the like. A pivot bracket 11 is pivotally mounted to the top end of the mounting bracket 5 about a substantially vertical winch swivel axis WSA.

Figure 2:
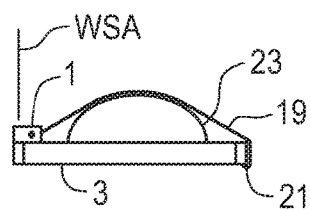
FIG. 2 is a schematic end view of the winch apparatus shown in FIG. 1.
Figure 3:
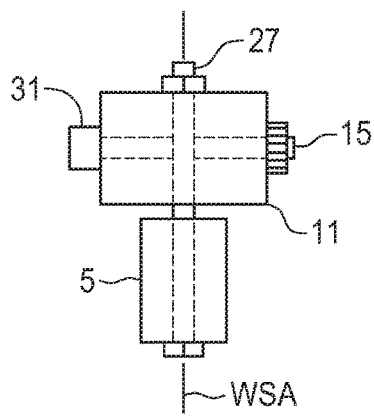
FIG. 3 is a schematic side view of the embodiment of the winch apparatus of FIG. 1.
Figure 4:
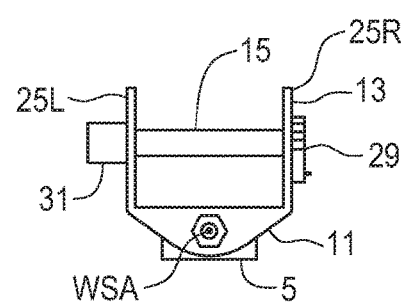
FIG. 4 is a schematic top view of the embodiment of the winch apparatus of FIG. 1.

A winch 13 is attached to the pivot bracket 11 and configured such that, when the mounting bracket 5 is mounted to one of the side edges 9R, 9L of the load bed 3, a winch shaft 15 of the winch 13 is oriented substantially horizontally and a bottom of the winch 13 is at a vertical location that is above a top surface 17 of the load bed 3 such that the winch 13 can pivot over the top surface 17 of the load bed 3 as shown in FIGS. 1 and 2.

A cargo strap 19 is attached to the winch 13 at an inner end thereof and includes an engagement member 21, typically a hook on a short length of chain, on an outer end thereof. When the winch 13 is mounted on the right side edge 9R of the load bed 3 and the cargo strap 19 is stretched over a low loaded object 23 with the engagement member 21 attached to the opposite left side edge 9L of the load bed 3, the winch 13 is able to pivot and extend over the top surface 17 of the load bed 3 to any position required to align the winch shaft 15 perpendicular to the cargo strap 19 so same can be wound straight onto the winch shaft 15 and tightened.

Figure 5:
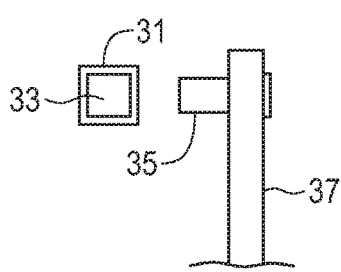
FIG. 5 is a schematic end view of the square drive recess in the end of the winch shaft of the winch apparatus of FIG. 1, configured to engage the drive end of the illustrated conventional ratchet wrench.

In the apparatus 1, a bolt 27 extends through the pivot bracket 11 into the mounting bracket 5, and the bolt 27 provides the winch swivel axis WPA. The illustrated pivot bracket 11 comprises right and left arms 25R, 25L and the winch shaft 15 extends through shaft holes in the right and left arms 25R, 25L and is rotatable in the shaft holes. A conventional winch ratchet 29 is mounted on one end of the winch shaft 15 and an opposite drive end 31 of the winch shaft defines a substantially square drive recess 33 as shown in FIG. 5 that is conveniently configured to receive a drive head 35 of a ratchet wrench 37. Thus a conventional ratchet wrench 37, such as with a ¾ or one inch square drive head, can be used to quickly and efficiently tighten the cargo straps 19.

Figure 6:
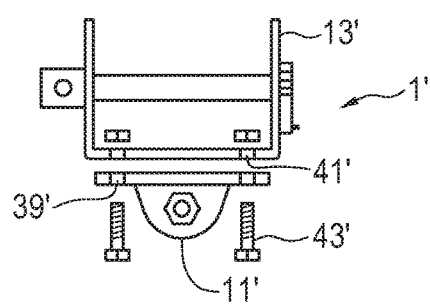
FIG. 6 is a schematic top view of an alternate winch apparatus where the winch is a conventional off-the-shelf winch attached to the pivot bracket by bolts.

FIG. 6 schematically illustrates an alternate winch apparatus 1' where the pivot bracket 11' is configured for attachment to a conventional off-the-shelf winch 13' which can be purchased separately. The pivot bracket 11' is configured to define holes 39' that correspond to holes 41' in the winch 13'. The winch 13' is then attached to the pivot bracket 11' by bolts 43' extending through the corresponding bolt holes 39', 41' in the pivot bracket 11' and winch 13'. The winch 13' is driven as in conventional winches by inserting a pry bar or the like into the illustrated holes in the drive end of the winch shaft.

Figure 7:
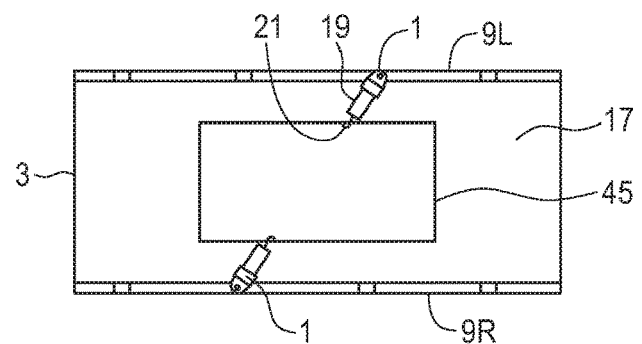
FIGS. 7 and 8 are respectively schematic top and end views of two winch apparatuses as shown in FIG. 1 attached to opposite sides of a load bed and where the engagement members on the outer ends of the corresponding cargo straps are attached to elevated locations on a relatively high loaded object.
Figure 8:
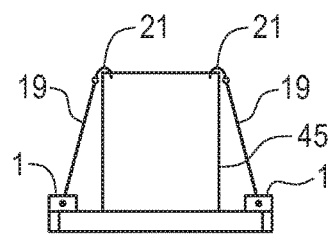

FIGS. 7 and 8 schematically illustrate winch apparatuses 1 mounted on right and left side edges 9R, 9L of the load bed 3 where the engagement members 21 are attached to elevated locations on a higher loaded object 45 instead of passing over the object 45 to the other side of the load bed. Again the winch apparatuses 1 are able to pivot to align with the cargo straps 19 once they are attached to the object 45.

The present disclosure further provides a method of driving a winch 13 to tighten a cargo strap 19 on a load bed 3. The method comprises mounting the winch 13 to a first side edge 9R of the load bed; winding a cargo strap 19 onto a winch shaft 15 of the winch 13, the cargo strap comprising an engagement member 21 on an outer end thereof; attaching the engagement member 21 to a desired location; forming a substantially square drive recess 33 in a drive end 31 of the winch shaft 15, the drive recess 33 configured to receive a drive head 35 of a ratchet wrench 37; and inserting the drive head 35 of the ratchet wrench 37 into the drive recess 33 and operating the ratchet wrench 37 to tighten the cargo strap 19.

Figure 9:
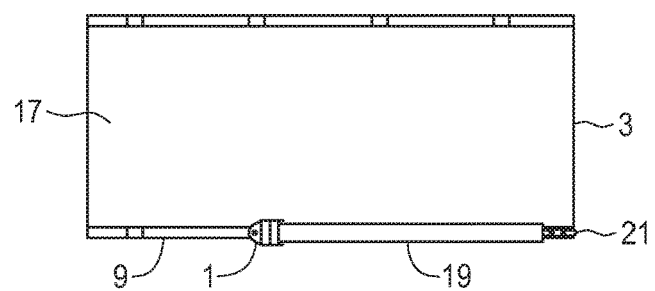
FIG. 9 is a schematic top view of the winch apparatus with the cargo strap in an extended stored position extending along the same side edge of the load bed to which the winch apparatus is mounted.

FIG. 9 schematically illustrates a further benefit of the swivel winch apparatus 1. In FIG. 9 the cargo strap 19 is extended along the same side edge 9 of the load bed 3 that the winch apparatus 1 is attached to, and the engagement member 21 is engaged with the end of the load bed 3 and the cargo strap 19 is tightened with the winch apparatus 1 in a stored position. Thus it is not necessary to wrap the cargo strap 19 onto the winch apparatus 1 for storage, as same can be tightened in the illustrated stored position leaving the top surface 17 of the load bed 3 clear and substantially unobstructed for loading and unloading.

The present disclosure thus provides a winch apparatus and method that allows cargo straps to extend at various angles with respect to a winch attached to a side edge 9 of the load bed 3 to secure loaded objects 23, 45 of various sizes and dimensions. The winch 13 can be configured to be conveniently driven by a conventional and commonly available ratchet wrench 37 of a size appropriate to the particular winch.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A load bed and winch apparatus, the apparatus comprising:
    a load bed with a plurality of stake pockets spaced along side edges thereof;
    a mounting bracket extending downward into one of the stake pockets and attached to the stake pocket;
    a pivot bracket pivotally mounted to a top end of the mounting bracket about a substantially vertical winch swivel axis; and
    a winch attached to the pivot bracket and configured such that a winch shaft of the winch is oriented substantially horizontally and a bottom of the winch is at a vertical location that is above a top surface of the load bed such that the winch can pivot over the top surface of the load bed.

2. The apparatus of claim 1 comprising a cargo strap attached to the winch at an inner end thereof and comprising an engagement member on an outer end thereof, and wherein the winch is mounted on a first side edge of the load bed and when the engagement member is attached to an opposite second side of the load bed, the winch extends over the top surface of the load bed.

3. The apparatus of claim 1 wherein the winch is attached to the pivot bracket by bolts extending through corresponding bolt holes in the winch and the pivot bracket.

4. The apparatus of claim 1 wherein the pivot bracket comprises right and left arms and wherein the winch shaft extends through shaft holes in the right and left arms and is rotatable in the shaft holes.

5. The apparatus of claim 4 comprising a bolt extending through the pivot bracket into the mounting bracket, and wherein the bolt provides the winch swivel axis.

6. The apparatus of claim 1 wherein a drive end of the winch shaft defines a substantially square drive recess configured to receive a drive head of a ratchet wrench.

\* \* \* \* \*